US006928281B2

(12) United States Patent
Ward et al.

(10) Patent No.: US 6,928,281 B2
(45) Date of Patent: Aug. 9, 2005

(54) ACTIVE ANTENNA SYSTEM WITH FAULT DETECTION

(75) Inventors: Dennis Paul Ward, Ypsilanti, MI (US); Richard David Zerod, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 420 days.

(21) Appl. No.: 10/318,418

(22) Filed: Dec. 12, 2002

(65) Prior Publication Data

US 2004/0116084 A1 Jun. 17, 2004

(51) Int. Cl.[7] .............................................. H04Q 7/20
(52) U.S. Cl. ........................ 455/423; 455/9; 455/13.3
(58) Field of Search .......................... 455/9, 13.3, 13.4, 455/19, 423–425, 522–523, 67.11, 67.14, 82–83, 590.1, 562.1, 579.7, 575.9, 90.3, 97–99, 119.1, 119.2, 130–136, 153.2, 193.1, 228.1, 226.4, 297; 324/524–529, 507; 343/703; 342/368–372

(56) References Cited

U.S. PATENT DOCUMENTS

| | | | | |
|---|---|---|---|---|
| 5,608,328 A | * | 3/1997 | Sanderson | .................. 324/529 |
| 5,794,138 A | | 8/1998 | Briskman | |
| 6,023,616 A | * | 2/2000 | Briskman | .................. 455/344 |
| 6,031,499 A | * | 2/2000 | Dichter | ..................... 343/713 |
| 6,272,328 B1 | * | 8/2001 | Nguyen et al. | .......... 455/277.1 |
| 6,437,577 B1 | | 8/2002 | Fritzmann et al. | |
| 6,603,436 B2 | * | 8/2003 | Heinz et al. | ................ 343/757 |
| 6,693,778 B1 | * | 2/2004 | Pittman et al. | ............... 361/42 |
| 6,806,812 B1 | * | 10/2004 | Cathey | .................... 340/572.7 |
| 2002/0060646 A1 | | 5/2002 | Petros et al. | |
| 2002/0070894 A1 | * | 6/2002 | Vail et al. | .................... 342/368 |
| 2004/0127247 A1 | * | 7/2004 | Reece et al. | ............. 455/550.1 |

* cited by examiner

Primary Examiner—Pablo N. Tran
(74) Attorney, Agent, or Firm—MacMillan, Sobanski & Todd LLC

(57) ABSTRACT

An active antenna power interface circuit couples a supply voltage from a radio receiver to an antenna feed. The circuit comprises a DC power input and a power switching element connected in series between the DC power input and the antenna feed. The power switching element has a control input for selecting a conducting state or a nonconducting state of the power switching element. A high side voltage sensor senses a first voltage proportional to a voltage at the DC power input. A low side voltage sensor senses a second voltage proportional to a voltage at the antenna feed. A controller is coupled to the control input and to the voltage sensors. The controller places the power switching element into the conducting state, samples the first and second voltages, calculates a voltage difference in response to the first and second voltages, compares the voltage difference to an upper limit and a lower limit. If the voltage difference is greater than the upper limit then the controller signals a short-circuit fault. If the voltage difference is less than the lower limit then the controller signals an open-circuit fault.

16 Claims, 3 Drawing Sheets

ACTIVE ANTENNA SYSTEM WITH FAULT DETECTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active antenna systems for radio receivers, and, more specifically, to a power interface for an active antenna including fault diagnostics and protection.

Powered antenna systems for radio receivers are often used in order to boost an antenna signal from an external antenna (i.e., an antenna not integrated into the receiver). A powered amplifier is located remotely with the antenna element and the amplified antenna signal is coupled to the receiver via an antenna feed, such as a coaxial cable. The amplification of the antenna signal avoids excessive signal degradation and loss that would occur during transmission from the antenna to the receiver.

In a mobile receiver system, such as an automotive radio receiver, it may be undesirable to provide an independent power supply having a main power feed at the antenna location. Therefore, a regulated power supply within the main radio receiver module (e.g., a head unit) may provide a DC voltage that is fed to an amplifier within a remote antenna module. In order to avoid any added conductor wires between the receiver and the antenna module, the DC power may be applied to the antenna feed itself. Highpass and lowpass filters are typically used to separate the DC voltage from the high frequency antenna signals at each end of the antenna feed.

An automotive application for which an active antenna is especially advantageous is a satellite radio receiver, such as for the Satellite Digital Audio Radio Service (S-DARS). A small S-band antenna module is typically mounted at the vehicle exterior, such as on a roof panel or a window glazing. A wire or cable installed between the S-DARS receiver and the antenna module courses through various body channels and cavities which may include various bends. If bent at too sharp an angle, a break may occur in the antenna signal line. Some body parts may be assembled after the antenna cable is put in place and the cable may be inadvertently pinched or otherwise damaged during assembly, which can lead to either open circuits (e.g., a break in the signal line) or a short circuit from the signal line to the vehicle body or between the signal line and the ground line (e.g., the shield conductor or a coaxial cable).

In the event of a fault in the antenna connection, it is desirable that the type of fault be automatically detected by the receiver and that there be a method for informing a service technician of the type of fault in order to facilitate repair of the fault. In the event of a short-circuit, the potential exists for damage to the radio receiver. Therefore, both fault detection and the ability to take protective action are desirable.

To improve cost and performance of radio receivers, their designs typically utilize the smallest electronic components possible. For example, in a satellite radio receiver, the RF tuner circuit may be miniaturized to the extent that leaded devices and even surface mount devices (SMD's) larger than an 0805 package style cannot be used. However, smaller sized components are more likely to be destroyed during a short-circuit condition. Consequently, it is desired that the circuitry for coupling a DC power input and for detecting fault conditions be implemented using SMD components of this smaller size while ensuring that the components will survive a short-circuit condition (e.g., until the short-circuit fault is detected and protective measures taken).

SUMMARY OF THE INVENTION

The present invention has the advantage of providing power to an active antenna while detecting both open-circuit faults and short-circuit faults. Small component sizes are used while preserving the ability of the components to survive a short-circuit condition.

In one aspect of the invention, an active antenna power interface circuit couples a supply voltage from a radio receiver to an antenna feed. The circuit comprises a DC power input and a power switching element connected in series between the DC power input and the antenna feed. The power switching element has a control input for selecting a conducting state or a nonconducting state of the power switching element. A high side voltage sensor senses a first voltage proportional to a voltage at the DC power input. A low side voltage sensor senses a second voltage proportional to a voltage at the antenna feed. A controller is coupled to the control input and to the voltage sensors. The controller places the power switching element into the conducting state, samples the first and second voltages, calculates a voltage difference in response to the first and second voltages, compares the voltage difference to an upper limit and a lower limit. If the voltage difference is greater than the upper limit then the controller signals a short-circuit fault. If the voltage difference is less than the lower limit then the controller signals an open-circuit fault.

DETAILED DESCRIPTION OF PREFERRED EMBODIMENTS

Figure 1:
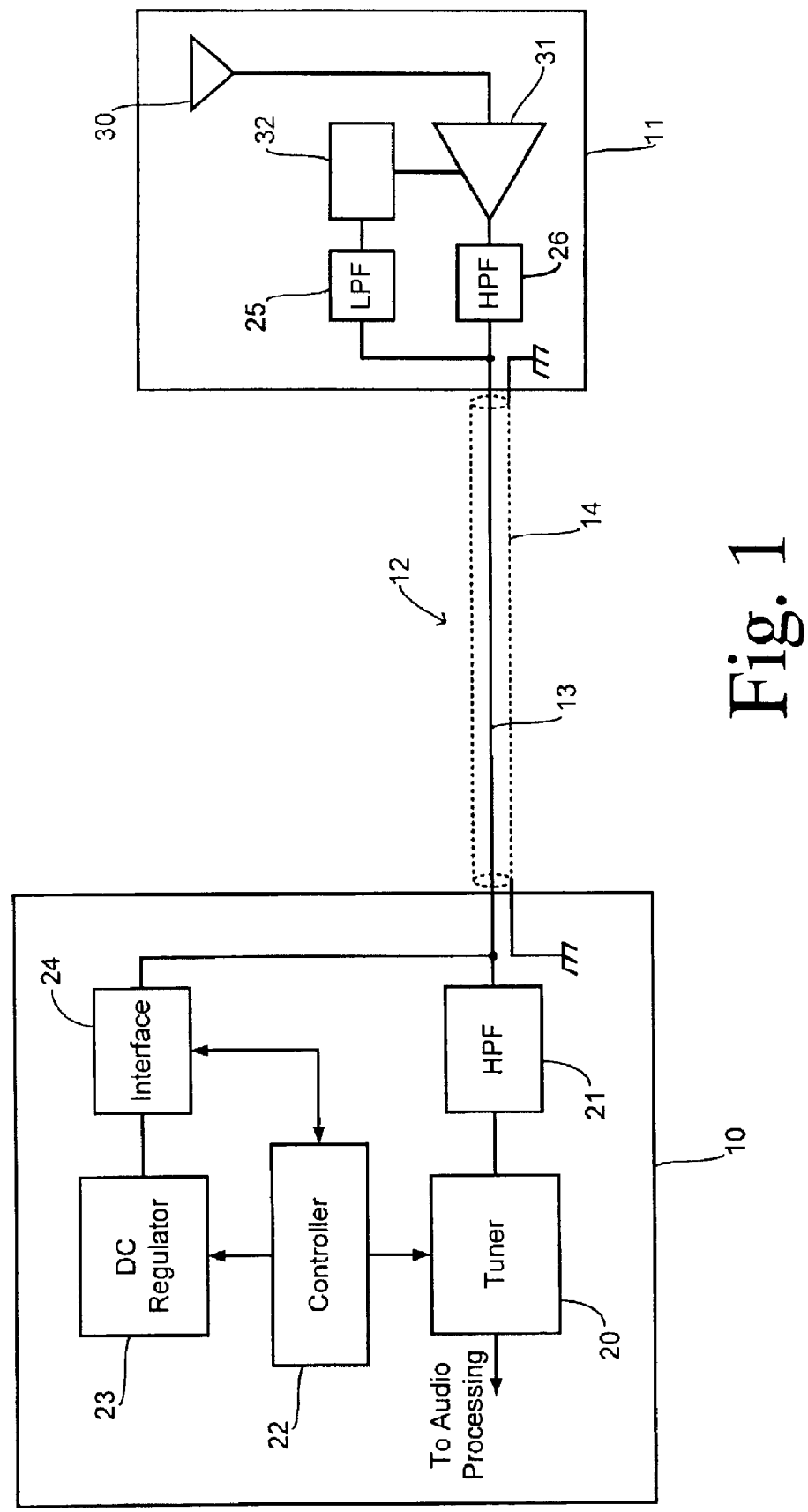
FIG. 1 is a block diagram showing a radio receiver and an active antenna system according to a preferred embodiment of the present invention.

Referring to FIG. 1, a radio receiver 10 is coupled to a remote antenna module 11 by an antenna feed or cable 12. In the preferred embodiment, antenna cable 12 comprises a coaxial cable having a signal line 13 surrounded coaxially by a grounded shield conductor 14, but other types of transmission lines either carrying both antenna signals and a power supply voltage or used with a separate power conductor can be used. While the preferred embodiment may include an automotive audio system incorporating an S-DARS receiver coupled to a body-mounted antenna module, other types of wireless RF receivers and types of antennas may be employed with the present invention.

Radio receiver 10 includes an RF tuner 20 that receives RF antenna signals from antenna signal line 13 via a highpass filter (HPF) 21. Demodulated signals from tuner 20 are provided to audio processing circuitry (not shown) such as a digital or analog signal processor. A controller 22 is connected to tuner 20 and to a DC regulator 23. Controller 22 coordinates operation of receiver 10 and may preferably be comprised of a programmable microcontroller. Regulator 23 is selectably activated by controller 22 when the radio reception function is active and it is desired to apply DC power to antenna module 11. A DC voltage from regulator 23 is coupled to signal line 13 via an interface circuit 24 (which includes a lowpass filter and other functions as described below). Controller 22 is also coupled to interface circuit 24 to selectively couple the DC voltage as described later in connection with FIGS. 2 and 3.

Antenna module 11 includes an antenna element 30 adapted to receive RF signals within the reception band of the receiver system. In an S-DARS receiver system, for example, antenna element 30 may comprise an S-band patch antenna fed by a coaxial cable. An RF-frequency antenna signal from element 30 is amplified by an RF amplifier 31 which drives antenna signal line 13 through a highpass filter 26. A DC power conditioner 32 conditions the DC power from signal line 13 via a lowpass filter 25 and applies it to a power input terminal of amplifier 31.

Figure 2:
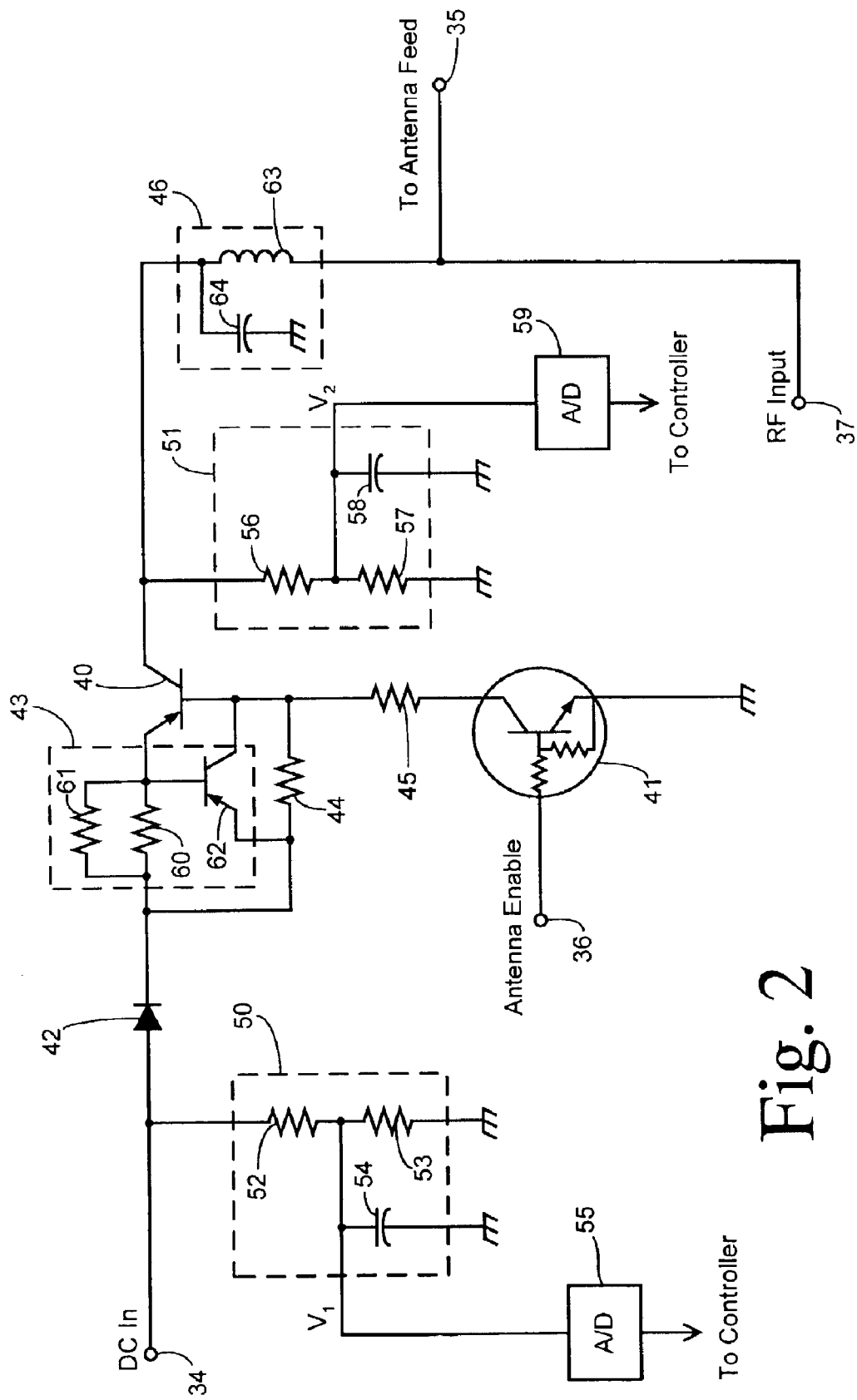
FIG. 2 is a schematic, block diagram showing a preferred embodiment of an interface circuit in greater detail.

Interface circuit 24 is shown in greater detail in FIG. 2. A series power switching transistor 40 is coupled between a DC input terminal 34 and an antenna feed terminal 35 to selectably couple DC power to the antenna feed under control of a transistor 41 which determines the conductive or nonconductive state of transistor 40 in response to an Antenna Enable signal from the microcontroller. By sensing a voltage drop across the power switching circuit, the present invention detects the occurrence of open-circuit and closed-circuit faults.

Considering the circuit in more detail, a diode 42 is connected to one side of a current limiter 43 which has its other side connected to the emitter terminal of transistor 40. A first bias resistor 44 is connected between diode 42 and the base terminal of transistor 40. A second bias resistor 45 couples the base terminal of transistor 40 to the collector terminal of transistor 41. The emitter terminal of transistor 41 is connected to ground and the base terminal of transistor 41 receives the Antenna Enable signal which is a positive logic signal with a high voltage level when it is desired to couple power to the antenna module. Transistor 41 is an npn bipolar transistor having internal bias resistors on its die. When the Antenna Enable signal is high, transistor 41 turns on so that current from DC input terminal 34 flows through diode 42 and bias resistors 44 and 45, thereby creating a predetermined voltage at the junction of bias resistors 44 and 45.

Current limiter 43 includes a pair of parallel resistors 60 and 61 coupled between diode 42 and the emitter terminal of transistor 40. Transistor 40 is shown as a pnp bipolar transistor. Prior to turning on, its emitter terminal receives a voltage equal to the DC input voltage reduced by one diode drop. A lower voltage produced at the junction of bias resistors 44 and 45 is applied to the base terminal of transistor 40. With a negative base to emitter voltage $V_{BE}$, transistor 40 changes to its conductive state. The effective resistance of resistors 60 and 61 is much less than the resistance of bias resistor 44 so that even after current is flowing through transistor 40, $V_{BE}$ stays in a range to keep transistor 40 in a conductive state. For example, resistors 60 and 61 may each have a resistance value of about 4Ω (producing an effective resistance of about 2Ω), resistor 44 a value of about 10 KΩ, and resistor 45 a value of about 620Ω. Parallel resistors 60 and 61 are used in this preferred embodiment rather than a single resistor to lower the overall power dissipation in each individual transistor so that resistor components with a smaller package size can be used (larger size SMD resistors tend to have increased reliability problems).

The DC power supply voltage (dropped by the diode drop of diode 42, the voltage drop of resistors 60 and 61, and the voltage drop across the emitter to collector resistance of transistor 40) is coupled through a lowpass filter 46 to antenna feed 35. Lowpass filter 46 includes a series inductor 63 and a parallel capacitor 64. High frequency RF signals returning from the antenna feed are blocked from entering the DC power circuits but are freely transmitted to RF input terminal 37.

Current limiter 43 also includes a pnp transistor 62 with its emitter terminal coupled to the high side of bias resistor 44 and its collector terminal coupled to the base terminal of transistor 40. The base terminal of transistor 62 is coupled to the junction between resistors 60 and 61 and the emitter terminal of transistor 40. As the magnitude of current through resistors 60 and 61 increases, their voltage drop (which equals $V_{BE}$ of transistor 62) also increases. Resistors 60 and 61 act as a current sensor for the current limiter. As transistor 62 activates, it acts in parallel to resistor 44 to increase the voltage to the base terminal of transistor 40, thereby reducing the $V_{BE}$ of transistor 40. As transistor 62 is driven with higher and higher voltages across the current sensing resistors, it proportionally reduces the conducting state of transistor 40 thereby limiting current flow to help prevent damage to any components by excessive current. By limiting the current, transistor 40 can be implemented with a smaller, cheaper device while still ensuring that it can survive any short term short-circuit conditions that arise. With the resistor values given above, current is limited to less than about 400 mA.

A high side voltage sensor 50 and a low side voltage sensor 51 are used to determine an overall voltage drop across the switching circuit in order to detect open-circuit and short-circuit faults. A sufficient drop may be obtained from transistor 40 alone or in combination with the resistance from resistors 61 and 61 or with the diode drop from diode 42. Thus, fault detection can be achieved without using a current limiter or its associated resistance. Diode 42 can be used to provide a consistent voltage drop regardless of load current and to help ensure that a maximum voltage for the active antenna is not exceeded. Placed in series at any point between sensors 50 and 51, diode 42 increases the sensed voltage drop to increase granularity of the detection.

High side sensor 50 includes resistors 52 and 53 connected in series between DC input terminal 34 and ground. The junction of resistors 52 and 53 is also coupled to ground by a capacitor 54. A voltage V, which is proportional to the DC input voltage is digitized by an analog-to-digital (A/D) converter 55 which may be contained within the microcontroller. If a separate A/D converter is used, the digital result is provided to the microcontroller. Capacitor 54 provides an averaging effect to reduce transients and may be required by the microcontroller or A/D converter for charge storage.

Low side sensor 51 includes resistors 56 and 57 connected in series between the input of lowpass filter 46 and ground. The junction of resistors 56 and 57 is also coupled to ground by a capacitor 58. A voltage $V_2$ which is proportional to the switching circuit output voltage is digitized by an analog-to-digital (A/D) converter 59 which may also be contained within the microcontroller. Similar components in sensors 50 and 51 may comprise identical components to provide the same voltage reduction ratio in order to simplify the mathematical calculations within the microcontroller to detect anomalies in the difference between the sensed voltages.

Figure 3:
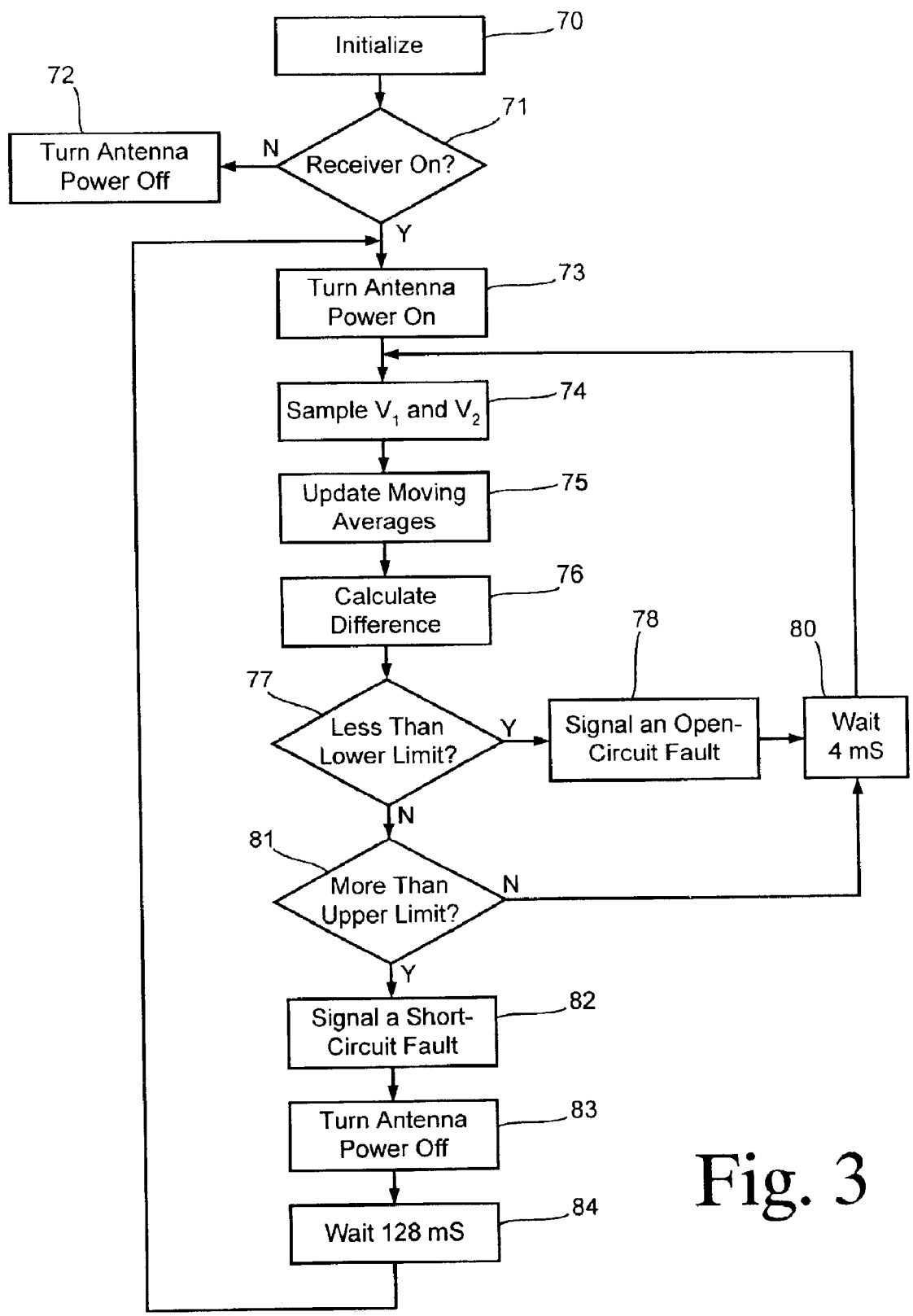
FIG. 3 is a flowchart showing a preferred method of the present invention.

Fault detection based on the sensed high side and low side voltages may use a preferred method as shown in FIG. 3. After initializing in step 70, the microcontroller checks in step 71 to determine whether the radio receiver is active. If not, then antenna power is turned off or remains off in step 72. If the radio receiver is turned on, then antenna power is turned on in step 73 by driving the Antenna Enable signal from the microcontroller to its high logic level. Using the A/D converters, voltages $V_1$ and $V_2$ are sampled in step 74. In order to further reduce transient effects, several consecutive voltage measurements (e.g., 4 consecutive samples) may be averaged. These moving averages are updated in step 75. The sample rate and number of samples included in the moving average are preferably determined according to an amount of time that the main switching transistor can safely dissipate heat caused during a short-circuit condition.

In step 76, a difference D between the moving averages of $V_1$ and $V_2$ is calculated. Difference D represents an overall voltage drop across the switching circuit which is proportional to the load current. If the load current is too high, then a short circuit is detected. If the load current is too low, then power is not being consumed by the antenna amplifier and an open circuit is detected. These conditions are detected by comparing difference D to an upper limit $L_U$ and a lower limit $L_L$ which may be stored in a look-up table, for example.

In step 77, a check is made to determine whether difference D is lower than lower limit $L_L$. If it is, then an open-circuit fault is signaled in step 78. Signaling of a fault preferably is comprised of setting a diagnostic code in the memory of the receiver so that the diagnostic code can be retrieved by a service technician who can then isolate and repair the fault. After signaling the fault, a predetermined sampling delay (e.g., 4 mS) is executed in step 80 and then a return is made to obtain the next samples in step 74. Preferably, the antenna power remains on during an open-circuit fault so that it will be available when the fault is corrected.

If step 77 determines that there is no open-circuit fault then a check is made in step 81 to determine whether difference D is greater than upper limit $L_U$. If it is not, then regular sampling continues via step 80. Otherwise, a short-circuit fault is signaled in step 82. To avoid thermal damage to the main switching transistor during a short circuit, antenna power is turned off is step 83 (e.g., the Antenna Enable signal is driven to a low logic level to remove the turn-on bias from the main transistor).

In order to restore antenna operation as soon as a short-circuit fault is corrected, periodic re-testing may be employed. After a predetermined delay in step 84 which is adequate to allow thermal recovery of the main transistor (e.g., 128 mS), a return is made to step 73 to turn the antenna power back on and to again sample the resulting voltages. If the short-circuit condition still exists, then the on-and-off cycling of antenna power continues until the fault is corrected or the antenna is no longer required to be enabled.

What is claimed is:

1. An active antenna power interface circuit for coupling a supply voltage from a radio receiver to an antenna feed, comprising:

a DC power input;

a power switching element connected in series between said DC power input and said antenna feed, said power switching element having a control input for selecting a conducting state or a nonconducting state of said power switching element;

a high side voltage sensor sensing a first voltage proportional to a voltage at said DC power input;

a low side voltage sensor sensing a second voltage proportional to a voltage at said antenna feed; and a controller coupled to said control input and to said voltage sensors, said controller placing said power switching element into said conducting state, sampling said first and second voltages, calculating a voltage difference in response to said first and second voltages, comparing said voltage difference to an upper limit and a lower limit, if said voltage difference is greater than said upper limit then signaling a short-circuit fault, and if said voltage difference is less than said lower limit then signaling an open-circuit fault.

2. The circuit of claim 1 wherein if said short-circuit fault is signaled, then said controller placing said power switching element into said nonconducting state.

3. The circuit of claim 2 wherein after placing said power switching element into said nonconducting state, said controller waits for a predetermined delay and then places said power switching element back into said conducting state and repeats said sampling, calculating, and comparing functions to detect whether said short-circuit fault continues to be present.

4. The circuit of claim 1 wherein said controller repeatedly samples said first and second voltages, averages respective pluralities of said samples, and calculates said voltage difference in response to a difference between an average of said first voltages and an average of said second voltages.

5. The circuit of claim 4 wherein each of said averages is comprised of a moving average including a predetermined number of samples.

6. The circuit of claim 1 wherein said controller is comprised of a microcontroller, and wherein said circuit further comprises analog-to-digital (A/D) converters for sampling said first and second voltages as respective digital values.

7. The circuit of claim 1 wherein said power switching element is comprised of a first transistor having a base terminal, an emitter terminal, and a collector terminal, and wherein said interface circuit further comprises a current limiter coupled to said first transistor.

8. The circuit of claim 7 wherein said current limiter comprises:

a current sense resistance in series with said first transistor; and a second transistor coupled between said base terminal and said emitter terminal of said first transistor and driven by a voltage across said current sense resistance in order to reduce said conducting state of said first transistor in proportion to a current through said current sense resistance.

9. The circuit of claim 1 wherein said high side and low side voltage sensors include respective storage capacitors in parallel with said A/D converters.

10. The circuit of claim 1 further comprising a lowpass filter connected between said power switching element and said antenna feed.

11. A method of powering a remote active antenna from a radio receiver via an antenna signal line, said method comprising the steps of:

coupling a DC power supply voltage to said antenna signal line through a power switch transistor;

sampling a first voltage proportional to said DC power supply voltage;

sampling a second voltage at a point between said power switch transistor and said antenna signal line;

calculating a voltage difference between said first and second voltages;

comparing said voltage difference to an upper limit and a lower limit;

if said voltage difference is greater than said upper limit then signaling a short-circuit fault; and if said voltage difference is less than said lower limit then signaling an open circuit fault.

12. The method of claim 11 wherein if said short-circuit fault is signaled, then decoupling said DC power supply from said antenna signal line.

13. The method of claim 12 wherein after decoupling said DC power supply from said antenna signal line, waiting for a predetermined delay and then repeating said coupling, sampling, calculating, and comparing steps to detect whether said short-circuit fault continues to be present.

14. The method of claim 11 further comprising repeating said sampling steps, averaging respective pluralities of samples of said first and second voltages, respectively, and calculating said voltage difference in response to a difference between an average of said first voltages and an average of said second voltages.

15. The method of claim 14 wherein each of said averages is comprised of a moving average including a predetermined number of samples.

16. The method of claim 11 further comprising the steps of:

sensing a magnitude of current flowing through said power switch transistor; and limiting conduction of said power switch transistor in response to said current magnitude.

* * * * *